(12) United States Patent
Nishide et al.

(10) Patent No.: US 9,719,554 B2
(45) Date of Patent: Aug. 1, 2017

(54) BALL JOINT AND MANUFACTURING METHOD THEREFOR

(71) Applicant: THK CO., LTD., Tokyo (JP)

(72) Inventors: Tetsuhiro Nishide, Tokyo (JP); Tsutomu Tokairin, Tokyo (JP); Haruki Shoji, Tokyo (JP); Junya Suenaga, Tokyo (JP)

(73) Assignee: THK CO., LTD., Tokyo (JP)

( * ) Notice: Subject to any disclaimer, the term of this patent is extended or adjusted under 35 U.S.C. 154(b) by 489 days.

(21) Appl. No.: 14/365,301

(22) PCT Filed: Dec. 14, 2012

(86) PCT No.: PCT/JP2012/082551
§ 371 (c)(1),
(2) Date: Jun. 13, 2014

(87) PCT Pub. No.: WO2013/099659
PCT Pub. Date: Jul. 4, 2013

(65) Prior Publication Data
US 2015/0003896 A1    Jan. 1, 2015

(30) Foreign Application Priority Data

Dec. 28, 2011 (JP) ................. 2011-289627
Mar. 9, 2012 (JP) ................. 2012-053613

(51) Int. Cl.
*F16C 11/06* (2006.01)

(52) U.S. Cl.
CPC ...... *F16C 11/0633* (2013.01); *F16C 11/0609* (2013.01); *F16C 11/0685* (2013.01);
(Continued)

(58) Field of Classification Search
CPC .............. F16C 11/0633; F16C 11/0642; F16C 11/0647; F16C 11/0685; F16C 11/0657;
(Continued)

(56) References Cited

U.S. PATENT DOCUMENTS 6,098,287 A    8/2000 Takahashi et al.
6,592,284 B1   7/2003 Rechtien et al.
(Continued)

FOREIGN PATENT DOCUMENTS

DE    103 61 289 A1    7/2005
JP    9-189322 A       7/1997
(Continued)

OTHER PUBLICATIONS

Machine Translation of JP 2005-249049, http://translationportal.epo.org, printed Oct. 19, 2016, 11pgs.*
(Continued)

*Primary Examiner* — Daniel Wiley
(74) *Attorney, Agent, or Firm* — Westerman, Hattori, Daniels & Adrian, LLP

(57) ABSTRACT

A ball joint is manufactured by molding a holder through casting by using a ball as a core and joining a shaft member to the ball after the casting through electric resistance welding. The ball joint includes: the ball; a resin sliding contact member including a first opening portion and a second opening portion that expose a spherical surface of the ball in opposite directions; the holder molded through the casting by using the ball and the resin sliding contact member as a core, the holder being obtained by integrally molding a closing portion that is held in contact with a part of the ball, which projects from the second opening portion of the resin sliding contact member; and the shaft member joined to another part of the ball, which is exposed from the first opening portion of the resin sliding contact member, through the electric resistance welding.

10 Claims, 9 Drawing Sheets

(52) U.S. Cl.
CPC ...... *F16C 11/0695* (2013.01); *F16C 2208/00* (2013.01); *F16C 2226/36* (2013.01); *Y10T 29/49826* (2015.01); *Y10T 403/32737* (2015.01)

(58) Field of Classification Search
CPC .............. F16C 11/0609; F16C 11/0695; F16C 11/0604; F16C 11/0623; Y10T 29/49648; Y10T 29/49657; Y10T 29/49659; Y10T 29/49655
See application file for complete search history.

(56) References Cited

U.S. PATENT DOCUMENTS

| | | | | |
|---|---|---|---|---|
| 6,715,207 | B2* | 4/2004 | Michioka | F16C 11/0604 29/527.5 |
| 6,941,656 | B2* | 9/2005 | Michioka | F16C 11/0633 29/898.043 |
| 7,870,673 | B2* | 1/2011 | Michioka | F16C 11/0633 29/898.043 |
| 8,281,490 | B2* | 10/2012 | Nishide | B21K 1/05 29/898.043 |
| 2001/0043767 | A1 | 11/2001 | Michioka et al. | |
| 2011/0072667 | A1 | 3/2011 | Michioka et al. | |

FOREIGN PATENT DOCUMENTS

| | | |
|---|---|---|
| JP | 2003-508702 A | 3/2003 |
| JP | 2003-220456 A | 8/2003 |
| JP | 2004-316771 A | 11/2004 |
| JP | 2005-249049 A | 9/2005 |
| JP | 2011-158028 A | 8/2011 |

OTHER PUBLICATIONS

International Search Report dated Mar. 19, 2013, issued in corresponding application No. PCT/JP2012/082551.

* cited by examiner

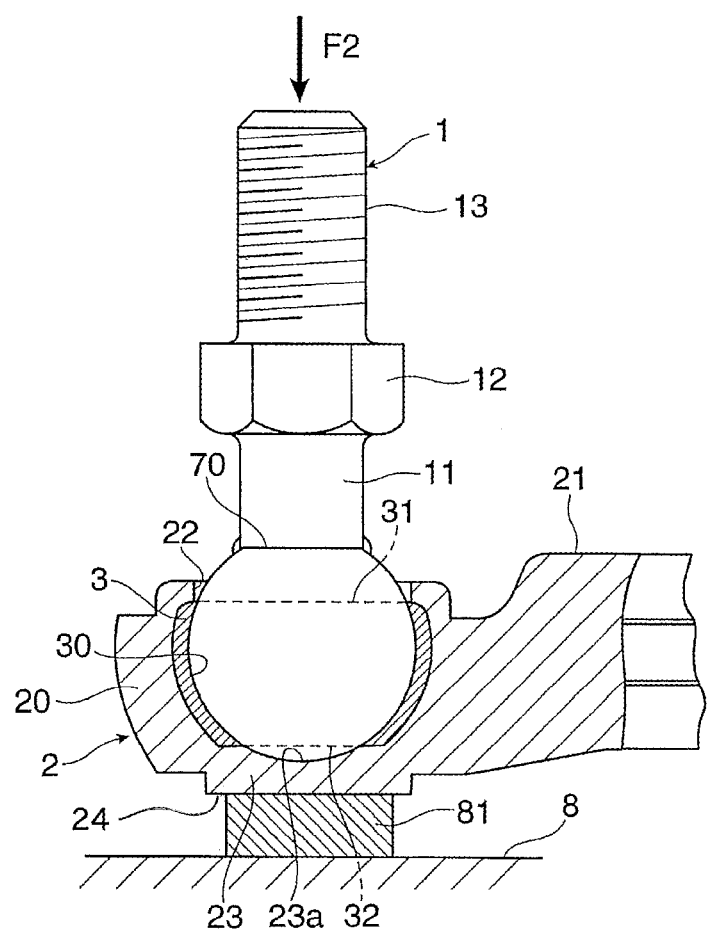

BALL JOINT AND MANUFACTURING METHOD THEREFOR

TECHNICAL FIELD

The present invention relates to a ball joint to be used in a link mechanism such as a stabilizer connecting rod and a transmission control unit of automobiles, and to a manufacturing method therefor.

BACKGROUND ART

As an example of the ball joint of this type, there has been known a ball joint as disclosed in JP 09-189322 A (Patent Literature 1). The ball joint disclosed in this document includes a ball stud having a ball provided to a distal end of a shaft member so as to serve as a pivot center of a link mechanism, and a holder for covering a largest diameter portion of the ball of the ball stud so as to be held in sliding contact with a spherical surface of the ball.

The holder is molded through casting by using the ball as a core. When a bearing steel ball having high sphericity is used as the ball, a metal sliding contact surface having high sphericity, onto which the spherical surface of the ball is transferred, is formed in the holder. Further, the ball stud is formed by joining the shaft member to the ball through electric resistance welding after casting of the holder. In order to perform the electric resistance welding, welding current needs to be supplied between the ball and the shaft member. However, the holder, which is molded through casting by using the ball as a core, is held in close contact with the ball. Thus, an electrode is brought into abutment not directly against the ball, but against the holder held in close contact with the ball. In this way, the welding current is supplied between the ball and the shaft member.

Further, the holder molded as described above is held in close contact with the ball due to casting shrinkage that occurs after the casting. In this state, the ball stud cannot be pivoted with respect to the holder. As a measure therefor, in the ball joint disclosed in Patent Literature 1, an impact is applied to the ball stud in an axial direction thereof so as to expand, under pressure by the spherical surface of the ball, the metal sliding contact surface of the holder that is formed through casting. With this, a clearance is secured between the holder and the ball, and the holder and the ball are separated from each other. In this way, the ball stud can be pivoted with respect to the holder.

Meanwhile, JP 2004-316771 A (Patent Literature 2) discloses a ball joint in which a ball and a holder molded through casting by using the ball as a core are separated from each other with a resin sliding contact member. The resin sliding contact member covers a largest diameter portion of the ball of the ball stud so as to be held in sliding contact with a spherical surface of the ball. The holder covers a periphery of the resin sliding contact member, and holds the resin sliding contact member. The holder is molded through casting by using the ball covered with the resin sliding contact member as a core, and the resin sliding contact member has a resin sliding contact surface in conformity with the spherical surface of the ball and is firmly fitted to the holder. With this, the ball stud is reliably smoothly operated with respect to the holder.

Further, as in Patent Literature 1, the ball stud is formed by joining a shaft member to the ball through electric resistance welding after casting of the holder. However, the resin sliding contact member is interposed between the ball and the holder, and hence welding current cannot be supplied to the ball with use of the holder unlike Patent Literature 1. Thus, a power supply port is formed through the resin sliding contact member and the holder, and a power supply electrode is brought into direct abutment against the ball through the power supply port.

In addition, in the ball joint of Patent Literature 2, the resin sliding contact member is reheated after completion of the casting of the holder so as to reduce a squeezing force of the resin sliding contact member with respect to the ball. With this, movement of the ball stud with respect to the holder is controlled. In other words, in the ball joint of Patent Literature 2, unlike Patent Literature 1, without a need to plastically deform the holder so as to intentionally secure a clearance between the ball and the holder, smooth movement of the ball stud with respect to the holder can be achieved.

CITATION LIST

Patent Literature

[PTL 1] JP 09-189322 A
[PTL 2] JP 2004-316771 A

DISCLOSURE OF THE INVENTION

Problems to be Solved by the Invention

In this way, in the ball joint of Patent Literature 2, the resin sliding contact member and the ball are held in sliding contact with each other substantially without any gap, and hence the ball stud can be smoothly operated. However, the above-mentioned power supply port needs to be provided through the holder and the resin sliding contact member. In order to prevent intrusion of foreign matter from an outside, the power supply port needs to be closed with a closing cap after completion of the ball stud. The closing cap is fixed to the holder by performing a crimping process on a rim of the power supply port. However, other components are also fixed to the opening of the holder, and hence, even when all possible measures are taken at the time of processes, sufficient sealability between the closing cap and the holder may be lost due to unexpected factors. In such a situation, a lubricating oil may leak from an inside of the holder sealed with the closing cap, or foreign matter may intrude from an outside to the inside of the holder. As a result, the smooth operation of the ball stud with respect to the holder may be hindered.

Means for Solving the Problems

The present invention has been made in view of the above-mentioned problems, and it is an object thereof to provide a ball joint and a manufacturing method therefor, which enable a shaft member to be joined to a ball through electric resistance welding without forming a power supply port through a holder that is molded through casting by using the ball as a core, and enable a ball stud to be reliably smoothly operated with respect to the holder without performing any special process on the holder after the casting.

In order to attain the above-mentioned object, according to one embodiment of the present invention, there is provided a ball joint, including: a ball; a resin sliding contact member having a sliding contact surface held in sliding contact with the ball, for covering a largest diameter portion of the ball, the resin sliding contact member including a first opening portion and a second opening portion that expose a spherical surface of the ball in opposite directions; a holder formed through casting by using, as a core, the ball and the resin sliding contact member mounted so as to cover the ball, the holder including: a main body portion for covering a periphery of the resin sliding contact member; and a closing portion for covering a part of the spherical surface of the ball, which projects from the second opening portion of the resin sliding contact member, so as to be held in contact with the ball, the main body portion and the closing portion being molded integrally with each other, the holder being kept out of contact with another part of the spherical surface of the ball, which is exposed from the first opening portion of the resin sliding contact member; and a shaft member integrated with the ball through electric resistance welding after the casting of the holder, to thereby construct a ball stud.

Further, in order to attain the above-mentioned object, according to one embodiment of the present invention, there is provided a manufacturing method for a ball joint, including the steps of: molding a resin sliding contact member having a sliding contact surface held in sliding contact with the ball, for covering a largest diameter portion of the ball, the resin sliding contact member including a first opening portion and a second opening portion that expose a spherical surface of the ball in opposite directions; molding a holder through casting by using, as a core, the ball and the resin sliding contact member mounted to cover the ball, the holder including: a main body portion for covering a periphery of the resin sliding contact member; and a closing portion for covering a part of the spherical surface of the ball, which projects from the second opening portion of the resin sliding contact member, so as to be held in contact with the ball, the holder being kept out of contact with another part of the spherical surface of the ball, which is exposed from the first opening portion of the resin sliding contact member; and forming a ball stud by bringing a shaft member into abutment against the another part of the spherical surface of the ball, which is exposed from the first opening portion of the resin sliding contact member, bringing an electrode into contact with the shaft member, bringing another electrode into contact with the closing portion of the holder, which is held in contact with the ball, and by joining the ball and the shaft portion to each other through electric resistance welding.

Effects of the Invention

In the holder, the closing portion for covering the part of the spherical surface of the ball, which projects from the second opening portion of the resin sliding contact member, so as to be held in contact with the ball is integrally formed through the casting. Thus, at the time of joining the shaft member to the ball through the electric resistance welding, by bringing a power supply electrode into abutment against the holder, welding current can be supplied from the closing portion to the ball. In other words, a power supply port needs not be formed through the holder, and hence a closing cap for closing the power supply port after completion of the welding of the ball stud can be omitted. In this way, reduction of the number of components and simplification of a manufacturing step can be achieved, and hence production cost can be reduced.

Further, the closing portion molded integrally with the holder through the casting is held in contact with the ball. In this context, when the shaft member is welded to the ball after the casting of the holder, the ball thermally expands at the time of the welding. Thus, the resin sliding contact member is deformed to expand more significantly in the vicinity of the first opening portion in which the shaft member is welded to the ball than in the vicinity of the second opening portion covered with the closing portion. Consequently, the ball after the welding is slightly shifted in a direction in which the ball rises from the closing portion. As a result, a contact pressure between the closing portion of the holder and the ball is reduced. In this way, without performing any special process on the holder after the casting, the ball stud can be reliably smoothly operated with respect to the holder.

BRIEF DESCRIPTION OF THE DRAWINGS

FIG. 10 is a front sectional view illustrating another example of the step of securing the clearance between the closing portion of the holder and the ball.

MODE FOR CARRYING OUT THE INVENTION

Now, detailed description is made of a ball joint and a manufacturing method therefor according to the present invention with reference to the accompanying drawings.

Figure 1:
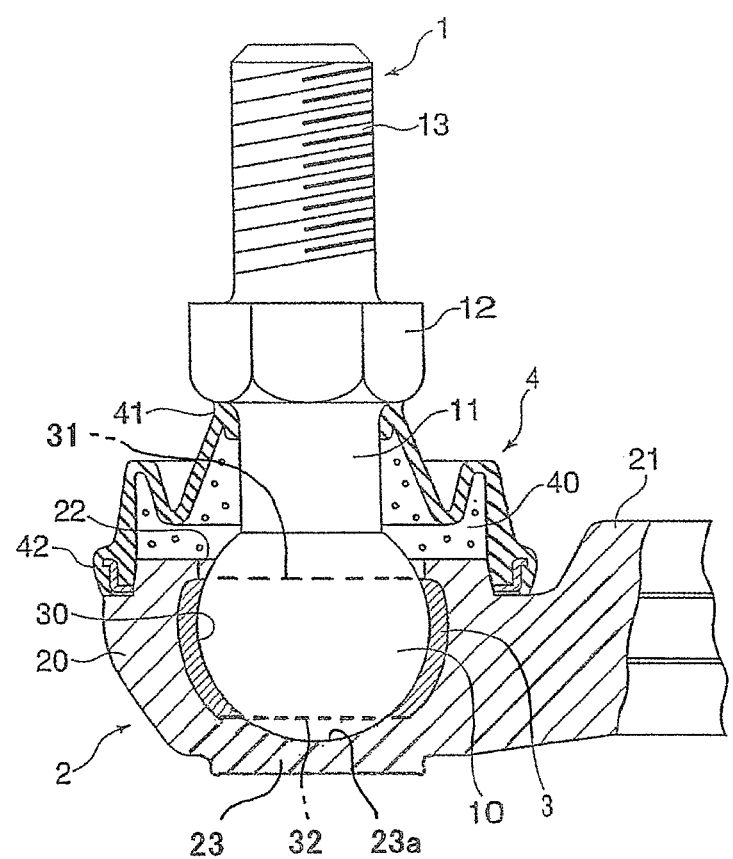
FIG. 1 is a front sectional view of a ball joint manufactured in a first embodiment of the present invention.

FIG. 1 illustrates a ball joint manufactured in a first embodiment of the present invention. The ball joint includes a ball stud 1 including a shaft member 11 and a ball 10 provided to a distal end of the shaft member 11, a resin sliding contact member 3 mounted to cover the ball 10 and is held in sliding contact with the ball 10, and a holder 2 molded around the resin sliding contact member 3 with the resin sliding contact member 3 being firmly fitted thereto. The ball stud 1 is coupled to the holder 2 so as to be freely pivotable about the ball.

The ball stud 1 is formed by joining the bar-like shaft member 11 to a bearing steel ball, which has high sphericity, serving as the ball 10 through electric resistance welding. The shaft member 11 includes a flange portion 12 having a seating surface for fixing a mounting object such as a link, and male threads 13 on the side opposite to the ball 10 across the flange portion 12. Further, the flange portion 12 is formed into a shape of a hex nut so that the male threads 13 of the ball stud 1 can be fastened to the mounting object such as the link with use of a spanner wrench.

Further, the resin sliding contact member 3 is formed into an annular shape so as to have a first opening portion 31 and a second opening portion 32 that expose a spherical surface of the ball 10 in opposite directions. On an inside of the resin sliding contact member 3, a resin sliding contact surface 30 having a shape of a concave spherical surface is formed substantially in conformity with the spherical surface of the ball 10. The shaft member 11 of the ball stud 1 is joined to the spherical surface of the ball 10, which is exposed from the first opening portion 31. The resin sliding contact member 3 covers a largest diameter portion of the ball 10, and covers substantially ⅔ of the spherical surface of the ball 10.

Meanwhile, the holder 2 includes a main body portion 20 provided around the resin sliding contact member so as to cover the resin sliding contact member, a fixation portion 21 for coupling the main body portion 20 to the link, and a closing portion 23 for covering the second opening portion of the resin sliding contact member so as to be held in contact with the spherical surface of the ball. The main body portion 20, the fixation portion 21, and the closing portion 23 are molded integrally with each other through die casting of an aluminum alloy or a zinc alloy. Note that, although not shown in FIG. 1, the fixation portion 21 includes female threads so that male threads formed, for example, along a distal end of a rod serving as the link are coupled thereto. Further, without providing the fixation portion 21, the main body portion 20 may be fixed directly to the mounting object.

The main body portion 20 is molded annularly on an outside of the resin sliding contact member 3, and the resin sliding contact member 3 is firmly fitted to the main body portion 20. Further, a holder opening portion 22 is formed through the main body portion 20 correspondingly to the first opening portion 31 of the resin sliding contact member 3, and a rim of the first opening portion 31 of the resin sliding contact member 3 is slightly exposed in the holder opening portion 22. In other words, the main body portion 20 of the holder 2 is kept out of contact with the spherical surface of the ball 10, which is exposed from the first opening portion.

Further, the closing portion 23 of the holder 2 is molded integrally with the main body portion 20 through the casting described above so as to cover the second opening portion 32 of the resin sliding contact member 3 and be held in contact with a convex spherical surface of the ball 10, which projects from the second opening portion 32. Specifically, a metal sliding contact surface 23a onto which the convex spherical surface of the ball 10 is transferred is formed on the closing portion 23, and the metal sliding contact surface 23a is held in contact with the convex spherical surface of the ball 10, which projects from the second opening portion 32. The metal sliding contact surface 23a is continuous with the resin sliding contact surface 30 of the resin sliding contact member 3 without a step. The metal sliding contact surface 23a and the resin sliding contact surface 30 integrally form the concave spherical surface that is held in contact with the ball 10 without a gap.

Further, a boot seal 4 is mounted between an outer rim of the main body portion 20 of the holder 2 and the shaft member 11 of the ball stud 1 so as to not only prevent intrusion of dust, foreign matter, and the like into gaps between the ball 10 of the ball stud 1 and the main body portion 20 of the holder 2, but also form a seal pocket 40 for receiving lubricant such as grease. Here, an end portion 41 on the ball stud 1 side of the boot seal 4 is brought into close contact with the shaft member 11 due to its elasticity. Meanwhile, an end portion 42 on the holder 2 side is fastened to the outer rim of the holder 2 with an engagement ring so as not to be disengaged even by pivotal or rotational movement of the ball stud 1.

Next, description is made of a specific manufacturing method for the ball joint according to the first embodiment.

Figure 2:
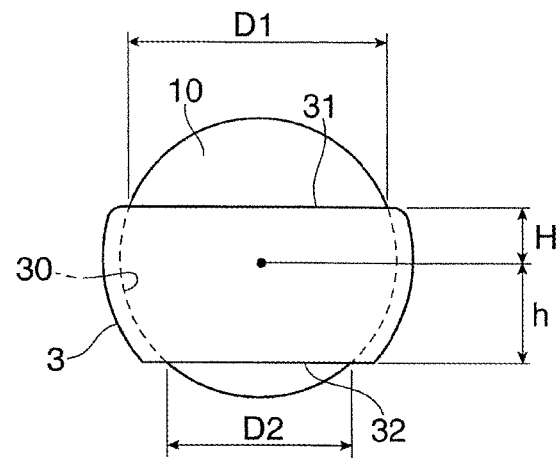
FIG. 2 is a front view illustrating a state in which a resin sliding contact member is mounted to cover a ball in a step of manufacturing the ball joint illustrated in FIG. 1.

In a first step of the manufacturing method, the resin sliding contact member 3 is molded and mounted to the bearing steel ball serving as the ball 10. As an example of a material for the resin sliding contact member 3, polyether ether ketone (product name: PEEK, produced by Victrex plc.) is used, and a thickness thereof is set, for example, to approximately 1.0 mm. FIG. 2 is a front view illustrating a state in which the resin sliding contact member 3 is mounted to the ball 10. The resin sliding contact member 3 is molded into an annular shape having an inner diameter corresponding to an outer diameter of the ball 10, and has the first opening portion 31 and the second opening portion 32 that expose the spherical surface of the ball 10 in the opposite directions as described above. An inner diameter D2 of the second opening portion 32 is set to be smaller than an inner diameter D1 of the first opening portion 31. When a distance H from a center O of the ball 10 to the first opening portion 31 and a distance h from the center O of the ball 10 to the second opening portion 32 are compared to each other, a relationship of H<h is established. Thus, the contact area between the resin sliding contact member 3 and the spherical surface of the ball 10 is small on the first opening portion 31 side with respect to the center O of the ball 10 and large on the second opening portion 32 side with respect to the center O of the ball 10.

As an example for mounting the resin sliding contact member 3 so as to cover the ball 10, it is conceived that the resin sliding contact member 3 is injection-molded together with the ball 10 as a core so that the resin sliding contact member 3 is molded and mounted to the ball 10 in a single step. In this way, when the resin sliding contact member 3 is molded together with the ball 10 itself as a core, time and effort in mounting the resin sliding contact member 3 to the ball 10 can be saved. In addition, the spherical surface of the ball 10 is transferred onto the resin sliding contact surface 30 of the resin sliding contact member 3. Thus, the resin sliding contact member 3 and the ball 10 are held in surface contact with each other without a gap, and a sliding contact state therebetween can be satisfactorily maintained.

Note that, the resin sliding contact member 3 may be mounted to the ball 10 by molding only the resin sliding contact member 3 without using the ball 10 as a core and pushing the ball 10 into an inside of the molded resin sliding contact member 3 through the first opening portion 31 of the molded resin sliding contact member 3.

Figure 3:
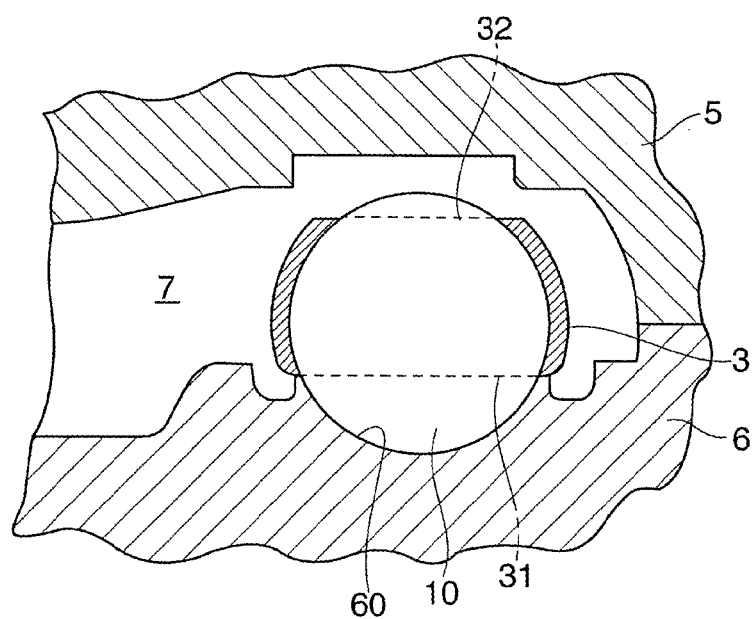
FIG. 3 is a sectional view illustrating how a holder is molded through casting by using the ball and the resin sliding contact member as a core in the step of manufacturing the ball joint illustrated in FIG. 1.

Next, the holder 2 is molded through die casting. At the time of the die casting, as illustrated in FIG. 3, the ball 10 and the resin sliding contact member 3 mounted to the ball 10 are inserted as a core into a pair of casting molds 5 and 6 split into upper and lower sides, and in this state, a melt of the aluminum alloy or the zinc alloy is poured under pressure into a cavity 7 in the molds. At this time, the spherical surface of the ball 10, which is exposed from the first opening portion 31 of the resin sliding contact member 3, is fitted to a support seat 60 having a shape of a concave spherical surface, which is formed in the mold 6. A rim of the support seat 60 is held in contact with the rim of the first opening portion 31 of the resin sliding contact member 3. Note that, in order to reliably fix the ball 10 to the support seat 60, a magnetic attraction force may be applied from the support seat 60 to the ball 10.

Figure 4:
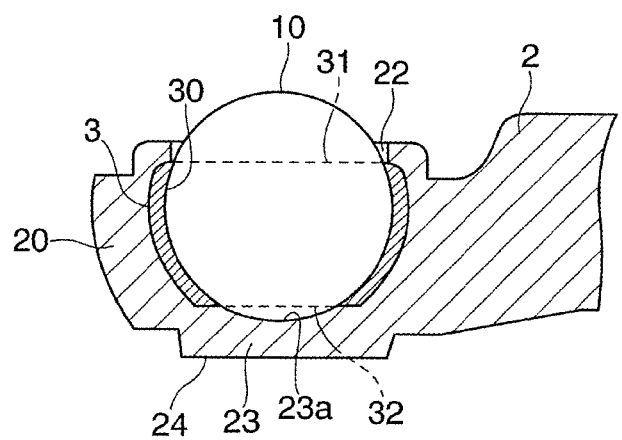
FIG. 4 is a front sectional view of the holder molded through the casting in the step of manufacturing the ball joint illustrated in FIG. 1.

With this, as illustrated in FIG. 4, the holder 2 including the ball 10 and the resin sliding contact member 3 that are surrounded by the above-mentioned alloy is obtained through casting. In the holder 2 obtained through casting, the holder opening portion 22 is formed at a part corresponding to the support seat 60 of the mold 6, and the ball 10 is exposed only from the holder opening portion 22. In this state, the holder 2 is kept out of contact with the ball 10 in the first opening portion 31 of the resin sliding contact member 3, and the second opening portion 32 is covered with the closing portion 23 molded integrally with the main body portion 20. In the closing portion 23, the metal sliding contact surface 23a is formed to be held in contact with the spherical surface of the ball 10, which projects from the second opening portion 32. Further, when the holder 2 is molded through casting, the resin sliding contact member 3 mounted to the ball 10 is embedded in the main body portion 20 of the holder 2 molded through casting. As a result, the resin sliding contact surface 30 of the resin sliding contact member 3 and the metal sliding contact surface 23a of the closing portion 23, which are held in contact with the ball 10, are formed continuously with each other as a single concave spherical surface without a step. Further, the concave spherical surface is held in contact with the spherical surface of the ball 10 without a gap.

Figure 5:
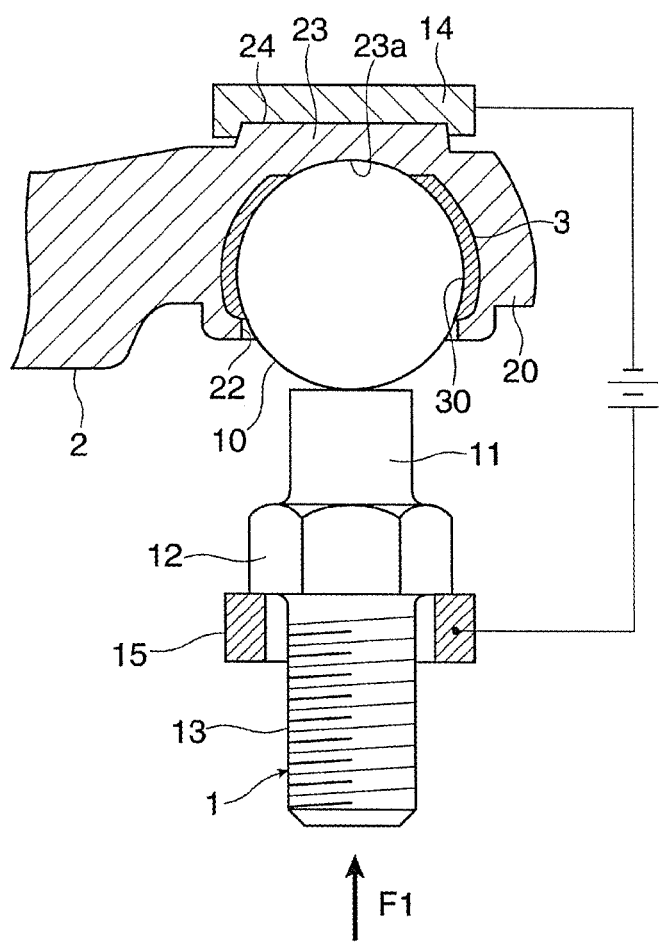
FIG. 5 is a front sectional view illustrating how a shaft member is welded to the ball surrounded and held by the holder in the step of manufacturing the ball joint illustrated in FIG. 1.

Next, the shaft member 11 is welded to the ball 10. At the time of the welding, projection welding as one type of the electric resistance welding is employed. Specifically, as illustrated in FIG. 5, an end surface of the shaft member 11 is brought into press contact, due to a predetermined force F1, with the spherical surface of the ball 10, which is exposed from the holder opening portion 22. Meanwhile, electrodes 14 and 15 are brought into abutment against the closing portion 23 of the holder 2 and the shaft member 11, respectively, and welding current is supplied to the closing portion 23 and the shaft member 11. On an outside of the closing portion 23, a mounting surface 24 for allowing abutment of the electrode 14 is formed, and the mounting surface 24 is formed into a circular shape about an axial center line of the ball stud 1. Further, the electrode 15 is formed into an annular shape so as to abut against the flange portion 12 of the shaft member 11.

The holder 2 is molded through casting by using the ball 10 and the resin sliding contact member 3 as a core. As a result, as described above, the metal sliding contact surface 23a onto which the spherical surface of the ball 10 is transferred is formed on the closing portion 23 of the holder 2, and the metal sliding contact surface 23a is held in contact with the spherical surface of the ball 10 without a gap. Thus, when the electrode 14 is brought into abutment against the closing portion 23, the welding current is supplied from the closing portion 23 to the ball 10. In this way, the ball 10 and the shaft member 11 can be joined to each other through the electric resistance welding.

Figure 6:
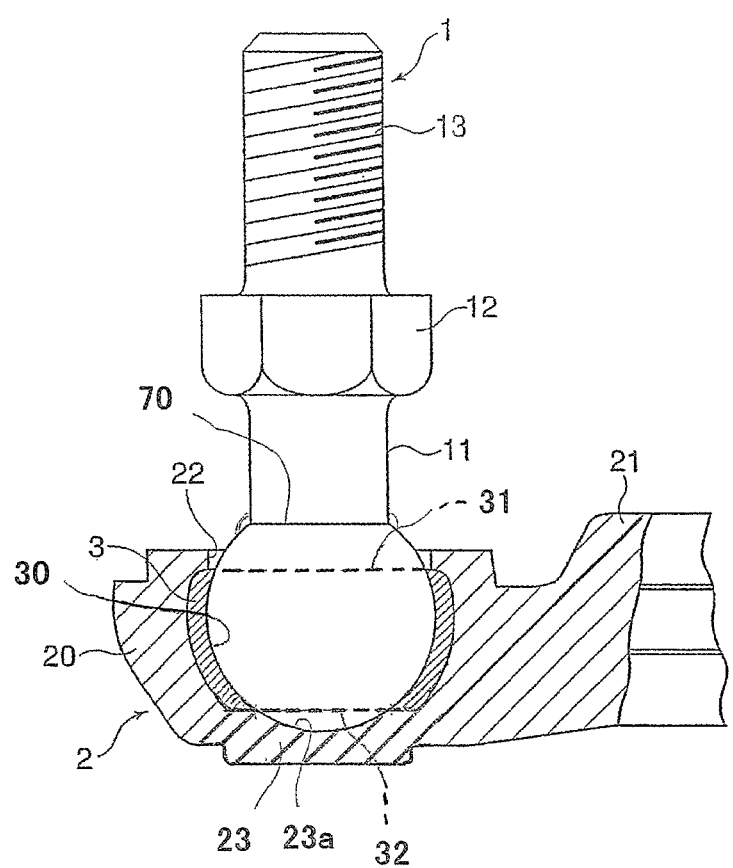
FIG. 6 is a front sectional view illustrating a state after the shaft member is welded to the ball in the step of manufacturing the ball joint illustrated in FIG. 1.

Then, when the electric resistance welding is completed in this way, as illustrated in FIG. 6, the distal end surface of the shaft member 11 is joined to the ball 10. In this way, the ball stud 1 in which the ball 10 is held by the main body portion of the holder 2 through intermediation of the resin sliding contact member 3 is completed.

In a stage after the holder 2 is molded through the casting and before the shaft member 11 is welded to the ball 10, the holder 2 gradually shrinks after the casting. Thus, the main body portion 20 of the holder 2 squeezes the ball 10 from an outside of the resin sliding contact member 3. Thus, in this state, high resistance is applied against the rotation of the ball 10 with respect to the resin sliding contact member 3. Further, the metal sliding contact surface 23a molded through the casting on the closing portion 23 of the holder 2 is held in tight contact with the ball 10. Also from this view point, the ball 10 is hindered from being freely rotated.

Figure 7:
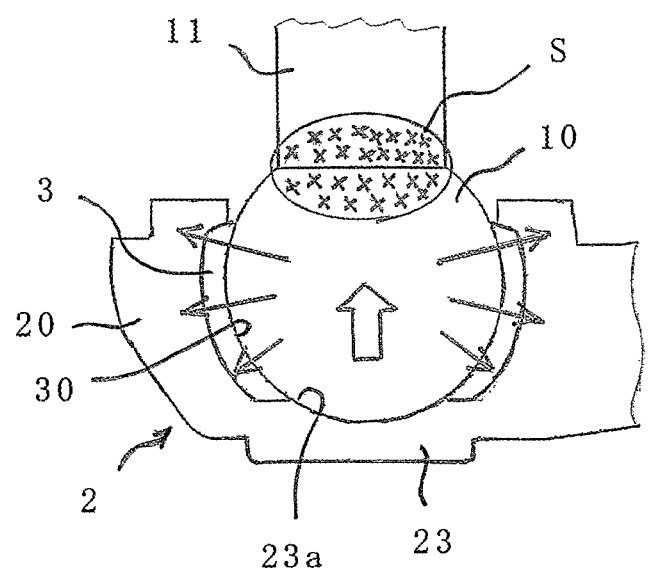
FIG. 7 is a schematic view illustrating how the ball expands the resin sliding contact member at the time when the shaft member is joined to the ball through electric resistance welding.

However, when the shaft member 11 is joined to the ball 10 through the electric resistance welding after the holder 2 is molded through the casting, as illustrated in FIG. 7, a periphery of a joined part between the ball 10 and the shaft member 11 serves as a heat source H to heat the ball 10. The heat is transmitted also to the resin sliding contact member 3 squeezing the ball 10. The ball 10 and the resin sliding contact member 3 have different thermal expansion coefficients, and shrink at different rates at the time of cooling. Thus, the resin sliding contact member 3, which is once expanded by heating, cannot be completely restored to its original shape in the shrinking stage at the time of the cooling. With this, the resin sliding contact member 3 squeezing the ball 10 can be loosened.

At this time, the ball 10 itself causes thermal expansion slightly larger than that under room temperature, and expands the resin sliding contact member 3. The heat source H is the joined part between the ball 10 and the shaft member 11. Thus, as indicated by the solid arrows in FIG. 7, an expansion amount of the ball 10 is larger in the vicinity of the first opening portion 31, and is smaller in the vicinity of the second opening portion 32 away from the heat source H than in the vicinity of the first opening portion 31. In other words, an amount of expansion of the resin sliding contact member 3 due to the thermal expansion of the ball 10 is larger in the vicinity of the first opening portion 31 than in the vicinity of the second opening portion 32.

Further, the main body portion 20 of the holder 2 is kept out of contact with the ball exposed from the first opening portion. However, the ball 10 is held in contact with the metal sliding contact surface 23a of the closing portion 23 through the second opening portion 32 of the resin sliding contact member 3. Thus, when the ball 10 is caused to expand by the heat at the time of the electric resistance welding, the ball 10 presses the metal sliding contact surface 23a and generates a repulsive force to cause a center of the ball 10 to be slightly shifted in a direction to the first opening portion 31. Thus, when the ball 10 causes thermal expansion, the resin sliding contact member 3 is expanded more significantly in the vicinity of the first opening portion 31 than in the vicinity of the second opening portion 32.

In this way, when the shaft member 11 is welded to the ball 10, under the state in which the ball is heated, the resin sliding contact member 3 is expanded temporarily more significantly in the vicinity of the first opening portion 31 than in the vicinity of the second opening portion 32. Thus, under a state in which the ball is cooled after the completion of the joining of the ball 10 and the shaft member 11, the ball is slightly shifted in a direction in which the ball rises from the closing portion 23 (direction indicated by the hollow arrow in FIG. 7). Thus, the ball 10 is held in contact with the metal sliding contact surface 23a of the closing portion 23, but contact pressure therebetween is reduced.

In other words, in the ball joint according to this embodiment, the closing portion 23 for covering the second opening portion 32 of the resin sliding contact member 3 is formed integrally with the holder 2, and the spherical surface of the ball 10, which projects from the second opening portion 32, is held in contact with the closing portion 23. After that, the electric resistance welding of the shaft member 11 to the ball 10 is completed. With this, a squeezing force of the resin sliding contact member 3 with respect to the ball 10 is reduced, and the contact pressure between the ball 10 and the metal sliding contact surface 23a of the closing portion 23 is reduced. In this way, without performing any special process, the ball stud 1 completed through the welding can be smoothly moved with respect to the holder 2.

In particular, in the first embodiment, the inner diameter D2 of the second opening portion 32 of the resin sliding contact member 3 is set to be smaller than the inner diameter D1 of the first opening portion 31 of the resin sliding contact member 3, and the spherical surface of the ball 10 is held in contact with the resin sliding contact member 3 over a larger area on the closing portion 23 side with respect to the center of the ball 10. Thus, when the squeezing force of the resin sliding contact member 3 is reduced through the welding of the shaft member 11 to the ball 10, a degree of freedom of the ball 10 is likely to become higher in the direction in which the ball 10 rises from the closing portion 23, as compared to a case where the first opening portion 31 and the second opening portion 32 are formed to have the same inner diameter. Thus, in the ball joint according to this embodiment, the contact pressure between the metal sliding contact surface 23a of the closing portion 23 and the ball 10 is more easily reduced, and the ball stud 1 can be smoothly moved with respect to the holder 2 while maintaining the contact state between the ball 10 and the closing portion 23.

The inner diameter of the first opening portion 31 of the resin sliding contact member 3 is determined based on a relationship with a movable range of the ball stud 1 with respect to the holder 2. Note that, in consideration of a case where a radial load in a direction orthogonal to an axial direction of the ball stud 1 is applied thereto, it is preferred that the contact area between the resin sliding contact member 3 and the ball 10 be large. In particular, it is preferred that the inner diameter of the second opening portion 32 of the resin sliding contact member 3 be set to be as small as possible, and as described above, the inner diameter D2 of the second opening portion be set to be smaller than the inner diameter D1 of the first opening portion.

Meanwhile, in order to join the ball 10 and the shaft member 11 to each other through the electric resistance welding, electrical resistance between the closing portion 23 and the ball 10 needs to be lower than electrical resistance between the ball 10 and the shaft member 11. This is because, in a case where the electrical resistance between the closing portion 23 and the ball 10 is higher than that between the ball 10 and the shaft member 11, an interface between the closing portion 23 and the ball 10 generates heat to cause the closing portion 23 to firmly fit to the ball 10. Thus, the contact area between the closing portion 23 and the ball 10, that is, the area of the spherical surface of the ball 10, which is held in contact with the metal sliding contact surface of the closing portion through the second opening portion, needs to be set to be larger than the welded portion area between the ball 10 and the shaft member 11. Here, the welded portion area refers to the area of the distal end surface of the shaft member 11, which is joined to the ball 10. Specifically, the welded portion area refers to the circular area of the welded portion denoted by the reference numeral 70 in FIG. 6, which corresponds to the cross-sectional area of the shaft member 11. More strictly, the welded portion area refers to the surface area of a part of the spherical surface of the ball 10, in which the shaft member 11 is joined to the ball 10.

In other words, the inner diameter D2 of the second opening portion 32 of the resin sliding contact member 3 is set to be smaller than the inner diameter D1 of the first opening portion 31, and the area of the spherical surface of the ball 10, which is held in contact with the closing portion 23 of the holder 2 through the second opening portion 32, is set to be larger than the welded portion area of the shaft member 11.

Further, according to the ball joint of the first embodiment, a power supply port, which is used at the time of joining the shaft member 11 to the ball 10 through the electric resistance welding, needs not be formed through the holder 2 that covers a periphery of the ball 10. Thus, a closing cap for closing the power supply port after completion of the welding of the ball stud 1 can be omitted. In this way, reduction of the number of components and simplification of a manufacturing step can be achieved, and hence production cost can be reduced.

Figure 8:
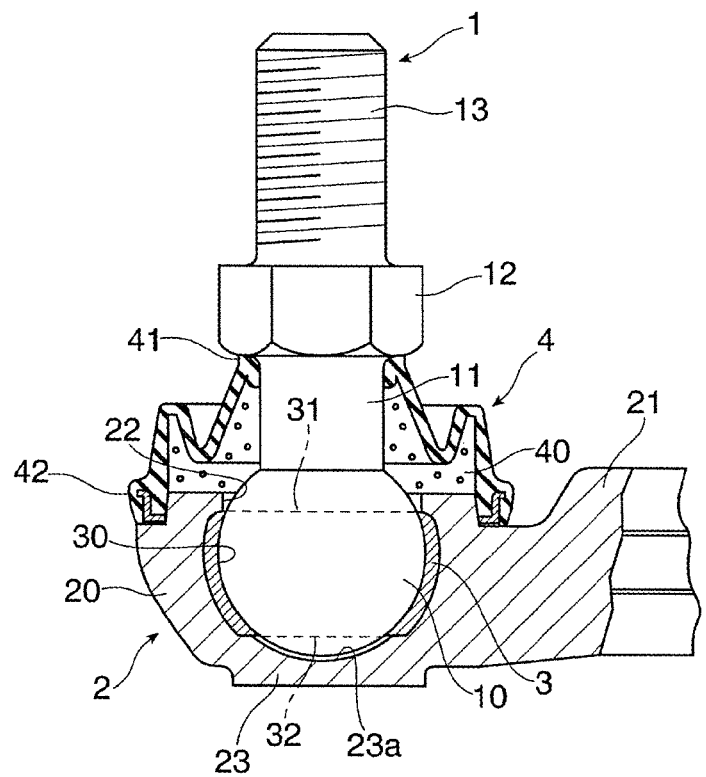
FIG. 8 is a front sectional view of a ball joint manufactured in a second embodiment of the present invention.

FIG. 8 illustrates a ball joint manufactured in a second embodiment of the present invention. The ball joint according to the second embodiment has substantially the same configuration as that of the ball joint according to the first embodiment described above, but is different from the ball joint according to the first embodiment only in that a clearance is intentionally provided between the closing portion 23 of the holder 2 and the convex spherical surface of the ball 10.

Specifically, the closing portion 23 of the holder 2 is molded integrally with the main body portion 20 through the casting described above, and after the casting, the closing portion 23 is held in contact with the convex spherical surface of the ball 10, which projects from the second opening portion 32 of the resin sliding contact member 3. However, in the manufacturing step after casting of the holder 2, the clearance is secured between the ball 10 and a distal end concave spherical surface 23a of the closing portion 23, which abuts against the ball 10. With this, the ball 10 and the closing portion 23 are kept out of contact with each other at the time of completion of the ball joint. Thus, when the ball stud 1 pivots with respect to the holder 2, the ball 10 is held in contact only with the resin sliding contact surface 30 of the resin sliding contact member 3.

Note that, in FIG. 8 illustrating the ball joint according to the second embodiment, the same components as those of the ball joint according to the first embodiment are denoted by the same reference symbols, and detailed description thereof is omitted.

A manufacturing method for the ball joint according to the second embodiment is substantially the same as that according to the first embodiment described above, but is different from the manufacturing method according to the first embodiment in further including a step of securing the clearance between the ball 10 and the closing portion 23 of the holder 2. This step is performed after the shaft member is welded to the ball so as to secure the clearance between the closing portion 23 of the holder 2 and the ball 10 of the ball stud 1. With this, a state in which the distal end concave spherical surface 23a of the closing portion 23 is held in contact with the ball 10 is cancelled.

Figure 9:
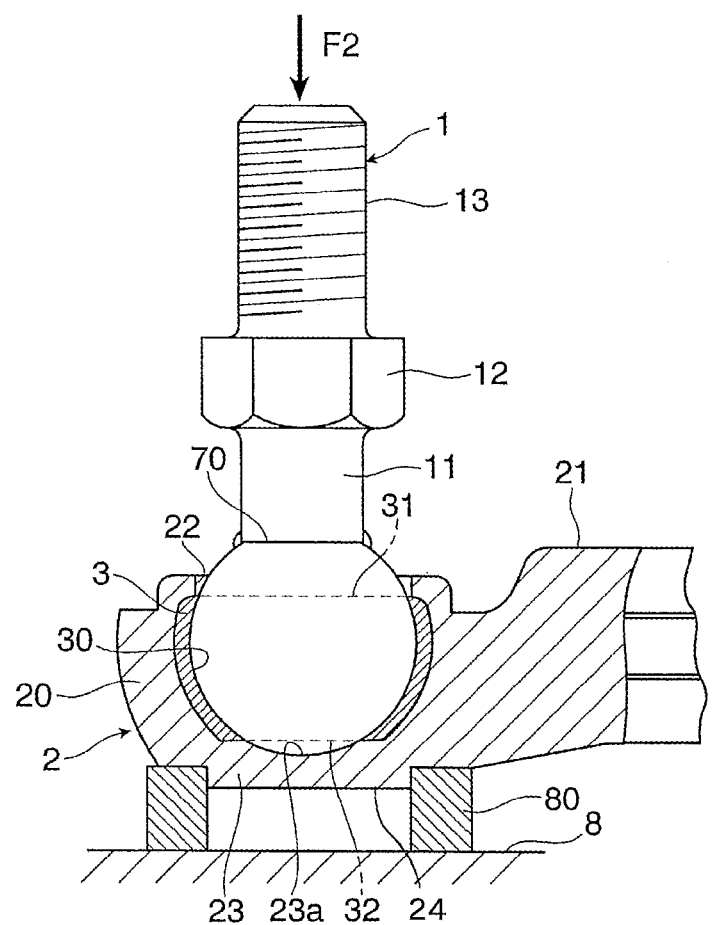
FIG. 9 is a front sectional view illustrating a step of securing a clearance between a closing portion of the holder and the ball in a manufacturing method for the ball joint illustrated in FIG. 8.

In this step, a clearance securing load F2 is applied to the ball stud 1 in the axial direction thereof after the ball stud 1 is completed through the electric resistance welding described above. With this, the ball 10 is pressed onto the distal end concave spherical surface 23a of the closing portion 23. Specifically, as illustrated in FIG. 9, an annular pressure receiving jig 80 is arranged on a fixation portion 8, and the pressure receiving jig 80 is brought into abutment against a periphery of the electrode mounting surface 24 formed on the closing portion 23 of the holder 2. In this state, the clearance securing load F2 is applied to the ball stud 1 in a direction in which the ball 10 is pressed against the closing portion 23 of the holder 2.

The pressure receiving jig 80 is held in abutment against a periphery of the closing portion 23 of the holder 2 in a manner of surrounding an axial center of the ball stud 1. Thus, when the clearance securing load F2 is applied to the ball stud 1, the ball 10 presses down the closing portion 23 of the holder 2. With this, the closing portion 23 is plastically deformed. At this time, in accordance with an amount of the plastic deformation of the closing portion 23, the ball 10 is slightly shifted inside the holder 2. As a result, the resin sliding contact member 3 interposed between the main body portion 20 of the holder 2 and the ball 10 of the ball stud 1 is elastically deformed by the clearance securing load F2. Then, when the application of the clearance securing load F2 is stopped, the resin sliding contact member 3, which has been elastically deformed, is restored to its original shape. In accordance therewith, the ball 10 is shifted in a direction in which the ball 10 is spaced apart from the distal end concave spherical surface 23a of the closing portion 23. With this, the clearance is secured between the ball 10 of the ball stud 1 and the closing portion 23 of the holder 2. A size of the clearance depends on a magnitude of the clearance securing load F2.

In this step, the clearance securing load F2 is applied to the ball stud 1 so as to intentionally secure the clearance between the ball 10 of the ball stud 1 and the closing portion 23 of the holder 2. However, the ball 10 itself is held in contact, without a gap, with the resin sliding contact member 3 fixed to the main body portion 20 of the holder 2, and the contact state between the resin sliding contact member 3 and the ball 10 is not changed before or after this step. Thus, even when the clearance is intentionally secured between the ball 10 of the ball stud 1 and the closing portion 23 of the holder 2, the ball 10 is held in sliding contact with the resin sliding contact member 3 without a gap. As a result, troubles such as backlash of the ball stud 1 with respect to the holder 2 do not occur.

Further, the step of securing the clearance between the closing portion 23 of the holder 2 and the ball 10 of the ball stud 1 may be divided into two steps. For example, prior to use of the above-mentioned annular pressure receiving jig 80 (refer to FIG. 9), as illustrated in FIG. 10, a disc-like pressure receiving jig 81 is brought into abutment against the electrode mounting surface 24 formed on the outside of the closing portion 23. In this state, the clearance securing load F2 is applied to the ball stud 1, and then the clearance securing load F2 is reapplied with the annular pressure receiving jig 80. By such two steps, the closing portion 23 is flattened and plastically deformed between the ball 10 and the pressure receiving jig 81 in the step using the disc-like pressure receiving jig 81, and the closing portion 23 is pressed down in the step using the annular pressure receiving jig 80. With this, the clearance secured between the closing portion 23 of the holder 2 and the ball 10 of the ball stud 1 becomes larger than that in the case of using only the annular pressure receiving jig 80.

Note that, the shapes of the above-mentioned pressure receiving jigs 80 and 81 are merely examples, and other shapes may be appropriately selected as long as the closing portion 23 of the holder 2 can be pressed and plastically deformed with the ball 10 through the application of the clearance securing load F2 to the ball stud 1.

Further, also according to the ball joint of the second embodiment, as well as the ball joint according to the first embodiment described above, the power supply port needs not be formed through the holder 2. Thus, the closing cap for closing the power supply port after completion of the welding of the ball stud 1 can be omitted. In this way, reduction of the number of components and simplification of the manufacturing step can be achieved, and hence production cost can be reduced.

Still further, in the ball joint according to the second embodiment, the clearance is intentionally secured between the distal end concave spherical surface 23a of the closing portion 23 and the ball 10 of the ball stud 1, and hence the ball 10 is held in contact only with the resin sliding contact surface 30 of the resin sliding contact member 3. With this, at the time of pivotal movement of the ball stud 1, the ball 10 of the ball stud 1 is not abraded against the metal holder 2 formed through casting, and backlash of the ball stud 1 with respect to the holder 2 does not occur. As a result, the ball stud 1 can be reliably smoothly operated over a long period of time.

The invention claimed is:

1. A ball joint, comprising:
    a ball;
    a resin sliding contact member having a sliding contact surface held in sliding contact with the ball, for covering a largest diameter portion of the ball, the resin sliding contact member comprising a first opening portion and a second opening portion that expose a spherical surface of the ball in opposite directions;
    a holder formed through casting by using, as a core, the ball and the resin sliding contact member mounted so as to cover the ball, the holder comprising:
        a main body portion for covering a periphery of the resin sliding contact member; and
        a closing portion for covering a part of the spherical surface of the ball, which projects from the second opening portion of the resin sliding contact member, so as to be held in contact with the ball,
        the main body portion and the closing portion being molded integrally with each other,
        the holder being kept out of contact with another part of the spherical surface of the ball, which is exposed from the first opening portion of the resin sliding contact member; and
    a shaft member joined to the another part of the spherical surface of the ball, which is exposed from the first opening portion of the resin sliding contact member, through electric resistance welding after the casting of the holder, to thereby construct a ball stud,
    wherein the resin sliding contact member covers the largest diameter portion of the ball,
    wherein an inner diameter of the second opening portion is set to be smaller than an inner diameter of the first opening portion, and
    wherein the inner diameter of the second opening portion of the resin sliding contact member is set so that an area of the part of the spherical surface of the ball, which is held in contact with the closing portion of the holder through the second opening portion, is larger than an area of a portion in which the shaft member is welded to the ball.

2. A manufacturing method for a ball joint, comprising the steps of:

molding a resin sliding contact member having a sliding contact surface held in sliding contact with the ball, for covering a largest diameter portion of the ball, the resin sliding contact member comprising a first opening portion and a second opening portion that expose a spherical surface of the ball in opposite directions;

molding a holder through casting by using, as a core, the ball and the resin sliding contact member mounted to cover the ball, the holder comprising the following portions that are integrally molded together:

a main body portion for covering a periphery of the resin sliding contact member; and a closing portion for covering a part of the spherical surface of the ball, which projects from the second opening portion of the resin sliding contact member, so as to be held in contact with the ball, the holder being kept out of contact with another part of the spherical surface of the ball, which is exposed from the first opening portion of the resin sliding contact member; and forming a ball stud by bringing a shaft member into abutment against the another part of the spherical surface of the ball, which is exposed from the first opening portion of the resin sliding contact member, bringing an electrode into contact with the shaft member, bringing another electrode into contact with the closing portion of the holder, which is held in contact with the ball, and by joining the ball and the shaft member to each other through electric resistance welding.

3. The manufacturing method for a ball joint according to claim 2, wherein the resin sliding contact member covers the largest diameter portion of the ball, and wherein an inner diameter of the second opening portion is set to be smaller than an inner diameter of the first opening portion.

4. The manufacturing method for a ball joint according to claim 3, wherein the inner diameter of the second opening portion of the resin sliding contact member is set so that an area of the part of the spherical surface of the ball, which is held in contact with the closing portion of the holder through the second opening portion, is larger than an area of a portion in which a distal end surface of the shaft member is projected onto the ball.

5. The manufacturing method for a ball joint according to claim 2, further comprising bringing the ball and a distal end concave spherical surface of the closing portion out of contact with each other by applying, in an axial direction of the ball stud, a clearance securing load to the ball stud after forming the ball stud.

6. The manufacturing method for a ball joint according to claim 5, further comprising bringing, at the time of applying the clearance securing load to the ball stud, an annular pressure receiving jig into abutment against the closing portion of the holder.

7. The manufacturing method for a ball joint according to claim 2, further comprising the resin sliding contact member applying a force against the ball in a direction away from said closing portion such as to reduce a contact pressure between the ball and the closing portion or create a clearance between the ball and the closing portion.

8. The manufacturing method for a ball joint according to claim 7, further comprising the resin sliding contact member applying a force against the ball in a direction away from said closing portion such as to reduce a contact pressure between the ball and the closing portion.

9. The manufacturing method for a ball joint according to claim 7, further comprising the resin sliding contact member applying a force against the ball in a direction away from said closing portion such as to create a clearance between the ball and the closing portion.

10. A ball joint, comprising:

a ball;

a resin sliding contact surface held in sliding contact with the hall, for covering a largest diameter portion of the ball, the resin sliding contact member comprising a first opening portion and a second opening portion that expose a spherical surface of the ball in opposite directions;

a holder formed through casting by using, as a core, the ball and the resin sliding contact member mounted so as to cover the ball, the holder comprising:

a main body portion for covering a periphery of the resin sliding contact member; and a closing portion for covering a part of the spherical surface of the ball, which projects from the second opening portion of the resin sliding contact member, the main body portion and the closing portion being molded integrally with each other, the holder being kept out of contact with another part of the spherical surface of the ball, which is exposed from the first opening portion of the resin sliding contact member;

a shaft member joined to the another part of the spherical surface of the ball, which is exposed from the first opening portion of the resin sliding contact member, through electric resistance welding after the casting of the holder, to thereby construct a ball stud;

wherein a clearance is secured between the spherical surface of the ball and the closing portion of the holder in the second opening portion of the resin sliding contact member, and a distal end of the closing portion is hollow with respect to the sliding contact surface of the resin sliding contact member.

* * * * *